Dec. 11, 1962 F. D. COVELY 3RD, ET AL 3,068,465
HIGH RESOLUTION RECORDING AND DISPLAY
Filed June 6, 1957 4 Sheets-Sheet 1

INVENTORS
FRANK D. COVELY, 3RD. &
BY DONALD J. PARKER

ATTORNEY

Dec. 11, 1962 F. D. COVELY 3RD, ET AL 3,068,465
HIGH RESOLUTION RECORDING AND DISPLAY
Filed June 6, 1957 4 Sheets-Sheet 3

INVENTORS
FRANK D. COVELY, 3RD. &
BY DONALD J. PARKER

ATTORNEY

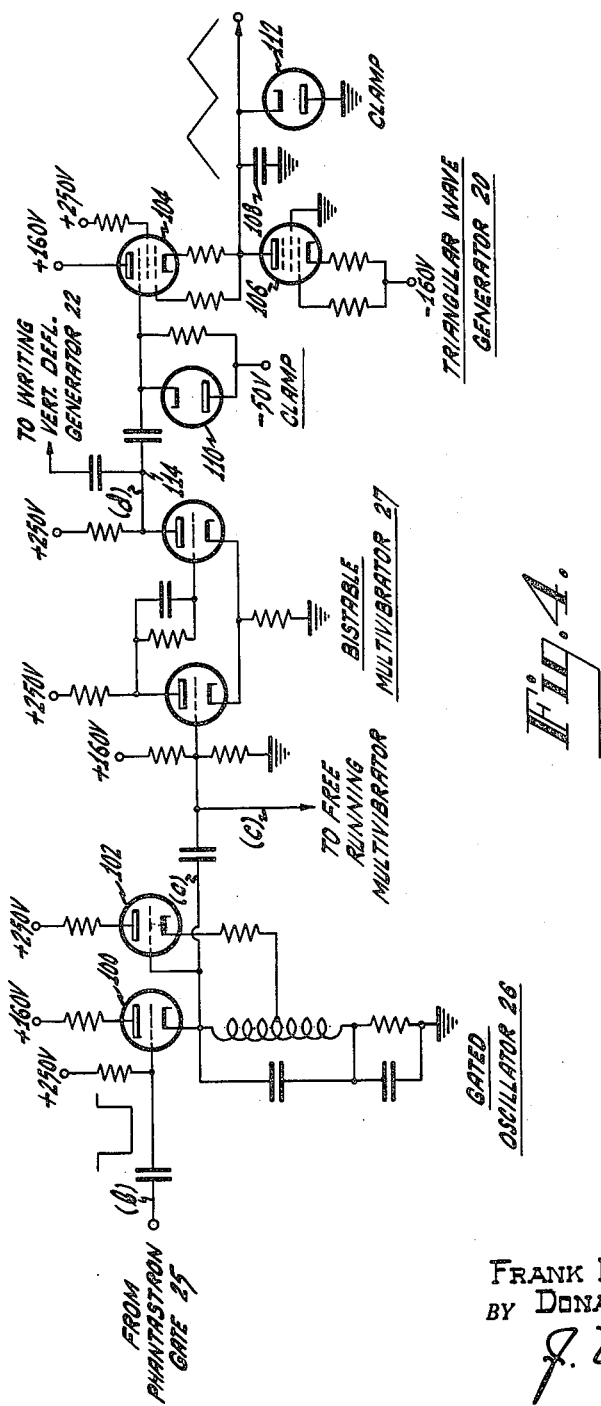

3,068,465
HIGH RESOLUTION RECORDING AND DISPLAY
Frank D. Covely 3rd, Haddonfield, and Donald J. Parker, Camden, N.J., assignors to Radio Corporation of America, a corporation of Delaware
Filed June 6, 1957, Ser. No. 664,838
17 Claims. (Cl. 343—5)

The purpose of this invention is to solve the problem of displaying and recording high resolution electrical signals. While not restricted thereto, the invention is particularly applicable to high resolution radar systems which provide target range information accurate to several feet.

In the discussion which follows, reference will be made to the radar art as a specific example of where the present invention may be used. It is to be understood, however, that the invention is applicable to numerous other types of systems in which high resolution electrical signal information is available which must be displayed and/or recorded. For example, the system is applicable to facsimile, special types of television recording systems, etc.

For the purpose of illustration, assume that it is required to record and display radar data in an aircraft, flying at a speed of 600 miles per hour, which transmits radar pulses in a direction perpendicular to its line of flight. The radar range data has a resolution of 5 feet, that is, the data is of sufficient accuracy to determine the range of an object within plus or minus 5 feet. The range of interest is 20 miles. The display resolution required is $$20 \text{ miles} \times 6000 \text{ feet per mile} \times \frac{1}{5 \text{ feet}}$$

or 24,000 lines, in television parlance. (The approximation 1 nautical mile=6000 feet is used to simplify the mathematics.) The information for each scan line is received in 20 miles×12 microseconds/miles=240 microseconds. During the time the information is being received, the aircraft is moving forward at a speed of 600 miles per hour, or approximately 1000 feet per second. For equal resolution in the direction that the aircraft is flying, it should move not more than 5 feet during one scan interval. Thus, the minimum pulse repetition frequency which can be employed is 1000/5=200 cycles per second. The pulse repetition period is therefore 1/200 or 5000 microseconds.

A cathode ray tube cannot be used to display information of the above high degree of resolution. The best resolution obtainable to date, to the writer's knowledge, is about 2000 lines, and this at extremely low light intensity. For acceptable display, the resolution must be substantially increased, and the light output of the cathode ray tube must be increased.

Another approach to the problem is to attempt to record the radar data directly on a permanent medium such as film or electrofax paper. Here, the recording medium, if of sufficient size does have the resolution required to record the information. However, the recording medium must be of high sensitivity. Also, the light source which excites the film or paper must be of high intensity, must be capable of being modulated at 100 megacycles or more, and must be scanned at the radar sweep speed (240 microseconds). These requirements appear to be insurmountable at the present state of the art.

According to the present invention, the incoming high resolution information is first applied to a device, the inherent resolution of which is much lower than that of the incoming signals. In a preferred form of the invention, the signals are applied to a storage tube. An important advantage of using the storage tube is that it is capable of recording even short duration signals at extremely high intensity. One practical tube, for example, is capable of recording a 1 microsecond sweep at full brilliance. However, the disadvantage of the storage tube is that its resolution is relatively low—about 500 lines, at the present state of the art. This disadvantage is overcome according to the invention by spreading the writing of the incoming information along a plurality of lines on the storage tube screen. Thus, if the inherent resolution is 500 lines and the incoming information is written on 40 lines, the resultant overall resolution is 20,000 lines.

The procedure described above solves several problems inherent in the recording of high resolution information. However, it introduces a new problem in that the information now on the screen of the storage tube is not in useable, that is, legible or understandable, form. According to this invention, the information on the storage tube is projected by an optical system onto a moving recording medium such as a relatively wide strip of moving electrofax paper. The optical system combines the separate lines end-to-end on the recording medium so that the recorded image corresponds to the high resolution electrical information.

Returning for a moment to the specific example discussed in the introductory portion of this application, the range of interest is 20 miles. This corresponds to 240 microseconds. In other words, the incoming information is written on the storage tube in 240 microseconds. The pulse repetition interval is roughly 5000 microseconds. This means there are approximately 4760 microseconds each cycle available for recording the information written on the storage tube. With the brightness available from the direct view storage tube, the recording can be done directly on the electrofax paper with an exposure of about 500 microseconds. The forward motion of the aircraft in 500 microseconds is about 0.5 foot so that the smear resulting from the motion of the paper (which moves at a speed related to that of the aircraft) is negligible.

Erasure of the storage tube can be accomplished during the remainder of the pulse repetition interval, that is, during the remaining 4240 seconds before the next transmitted pulse.

If the pulse repetition rate is increased, say 5 to 10 times, an ordinary cathode ray tube can be used instead of the storage tube. The increase in pulse repetition rate increases the number of times the image is written on the cathode ray tube screen during the time the aircraft moves five feet, and this increases the intensity of the image written on the screen.

The invention will be described in greater detail by reference to the following description taken in connection with the accompanying drawing in which:

FIGURE 4 is a schematic circuit diagram of a portion of the circuit shown in FIGURE 1.

In the figures similar reference numerals are applied to similar elements.

Figure 1:
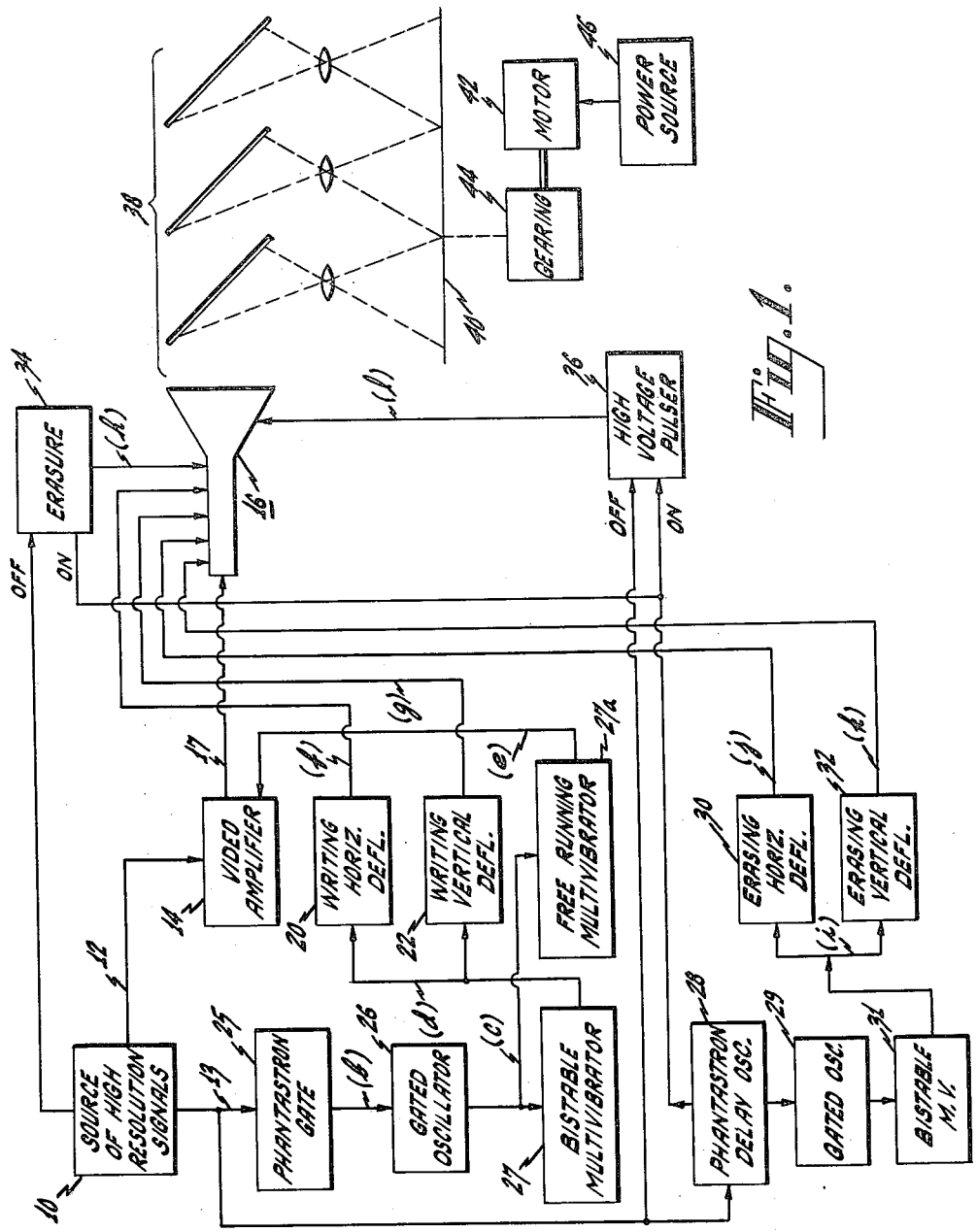
FIGURE 1 is a block circuit diagram of a preferred form of the invention.

Referring to FIGURE 1, the source of high resolution signals is indicated by block 10. The source may, for example, be a radar system and the video output signals are available at leads 12 and 13. These signals are applied through video amplifier 14 to the writing gun grid of storage tube 16. The video information $a$ at lead 17 is shown in FIGURE 2a. The first pulse is the transmitted pulse, and the remainder of the signals are noise and echoes.

Figure 2:
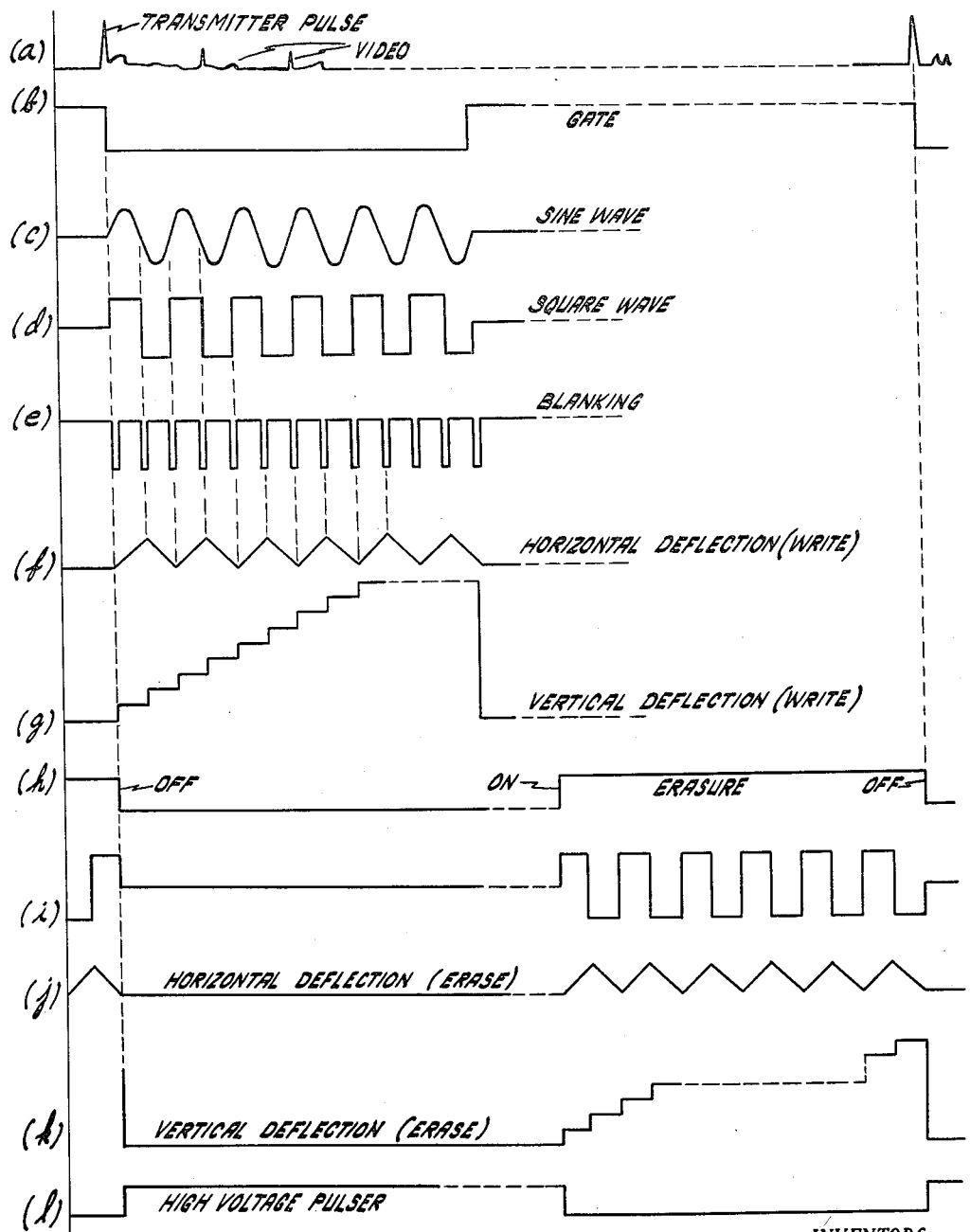
FIGURE 2 shows waveforms present at various points in the circuit of FIGURE 1.

Trigger pulses from the source 10 are applied over lead 13 through a phantastron gate circuit 25 to a gated oscillator 26. Details of a suitable oscillator are shown in FIGURE 4, which is discussed in more detail later, and in volume 19 of the Radiation Laboratory Series at pages 226–235. Details of a suitable phantastron circuit are given in the same volume at pages 195–200. (In the discussion which follows, various pages of volume 19 of the Radiation Laboratory Series will be made reference to.) The output of the phantastron is a square wave $b$. The output of gated oscillator 26 consists of a gated sine wave $c$. These waves and others to be discussed below are shown in FIGURE 2.

The sine wave of stage 26 is applied to a bistable multivibrator 27 and to a sine wave synchronized, free running multivibrator 27a. The output of the latter is a wave $e$ having a short negative duty cycle.

The square wave output $d$ of the bistable multivibrator 27 is applied to the horizontal writing deflection generator 20, which produces triangularly shaped wave $f$. Wave $f$, in turn, is applied to the horizontal deflection means of storage tube 16. A deflection wave of this type first deflects the electron beam from left to right and then from right to left, etc. A suitable triangular wave sweep circuit is shown in FIGURE 4.

Referring briefly to FIGURE 4, the gated oscillator 26 consists of a gate stage 100 followed by a Hartley oscillator 102. The gate stage 100 is driven to cut off during the negative-going portion of gate $b$. During this interval the Hartley oscillator 102 produces the sine wave $c$. However, upon the termination of the negative gate $b$, gate tube 100 begins to conduct heavily and this biases the Hartley oscillator to cut off.

The sine wave $c$ is applied to bistable multivibrator 27 and controls the operating frequency of the bistable multivibrator. Square wave $d$ generated by the bistable multivibrator has a period which corresponds to a period of the triangular wave. In other words, the upward excursion of the square wave corresponds to the upward excursion of the sawtooth wave and the downward excursion of the square wave to the downward excursion of the sawtooth wave.

The triangular wave generator 20 consists of a pair of serially connected pentodes 104, 106. The pentodes are balanced in such manner that the upper one 104 conducts twice as much as the lower one 106. With the upper pentode 104 conducting (due to the upward excursion of the square wave) the charging capacitor 108 goes positive due to conduction of electrons from it at a constant rate. On the next excursion (downward) of the square wave, the upper pentode is cut off. Now the charging condenser 108 goes negative (at a constant rate) because the electrons flowing through the lower pentode are collected by it. Clamper diodes 110 and 112 are conventional.

Wave $d$ is available at point 114 in the circuit of FIGURE 4. Returning now to FIGURE 1, wave $d$ is applied to the writing vertical deflection wave generator 22 which produces a step type wave $g$. A suitable generator is shown in volume 19 at pages 293–294. This wave is applied to the vertical deflection means of the storage tube and it causes the succeeding horizontal sweeps to be written, one beneath the other.

In order to prevent distortion at the beginning of each vertical step, the wave $e$ (from stage 27a) is applied to the video amplifier 14. Here it acts as a blanking signal.

The erasure stages for the storage tube are similar to the writing stages. The input signals from lead 13 are applied to a phantastron delay circuit 28 which inserts a delay sufficient to permit the information written on the storage screen to be recorded. The delay, for example, may be on the order of 500 microseconds or so. The delayed pulses derived from the radar transmitter pulses are applied to a gated oscillator 29 which is similar to oscillator 26. The gated sine wave signals from oscillator 29 are applied to a bistable multivibrator 31 which is similar to bistable multivibrator 27. Bistable multivibrator 31 triggers the erasing horizontal deflection circuit 30 which is similar to circuit 20, and the erasing vertical deflection circuit 32 which is similar to circuit 22. The output waves $i$, $j$ and $k$ of the stages just discussed are shown in FIGURE 2.

Erasure stage 34 consists of a bistable multivibrator. It is turned on by pulses from phantastron delay oscillator 28 and turned off by pulses from source 10. The erasure blanking voltage $h$ which consists of a square wave signal, is applied to the erasing gun grid of the storage tube.

High voltage pulser 36 consists of a second bistable multivibrator. It is turned on from the pulses from phantastron delay oscillator 28 and turned off by pulses from source 10. The function of the high voltage pulser 36 is to prevent light from being emitted from the storage tube during the erasure interval. During this interval, the high voltage $b$ is reduced in amplitude as is shown in FIGURE 2l.

As already mentioned, waves $f$ and $g$ from the writing horizontal and vertical deflection generators 20 and 22 are applied to the horizontal and vertical deflection means, respectively, of the storage tube 16. Horizontal and vertical erasure voltages $j$ and $k$ are applied to the horizontal and vertical erasing beam deflection means of storage tube 16.

The light emitted from the storage tube is focused by an optical system 38 onto a moving recording medium 40. The optical system is described in further detail later in connection with FIGURE 3. The recording medium may be film but preferably comprises sensitized electrofax paper. The paper is driven by a motor 42 and gears 44. The motor speed is preferably synchronized with the aircraft speed by applying power to the motor from source 46, the magnitude of the power being proportional to the aircraft speed.

Figure 3:
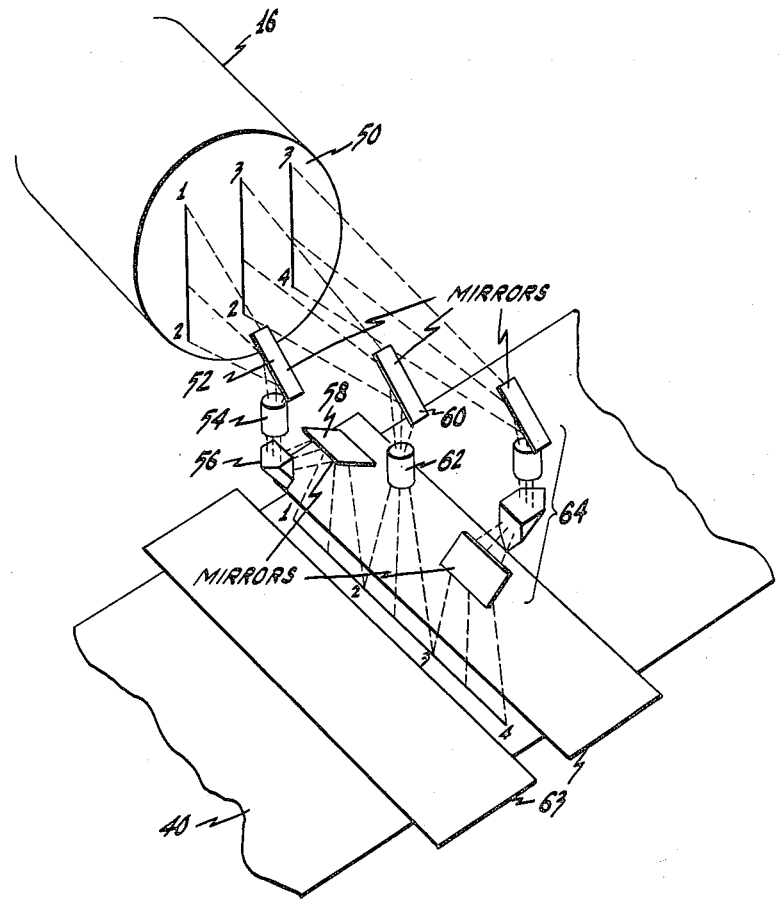
FIGURE 3 is a more detailed showing of an optical system which may be used in the arrangement of FIGURE 1.

FIGURE 3 shows the face 50 of storage tube 16. For the purpose of this illustration, it is assumed that each line of incoming radar information is written on the storage tube screen as three lines. This effectively increases the resolution of the storage tube from 500 lines to 1500 lines. In the illustration, the lines are written vertically. Numbers are applied to the ends of the lines to show the direction in which they are written. Thus, lines 1, 2 and 3, 4 are written from top to bottom, as viewed in the drawing, and the middle line 2, 3 is written from bottom to top.

Line 1, 2 is optically focused onto the moving electrofax paper 40 by an optical system including mirror 52, lens 54, reversing prism 56 and mirror 58. The middle line is projected onto the moving electrofax paper in end-to-end alignment with the first line by mirror 60 and lens 62. The last line 3, 4 is optically focused onto the moving electrofax paper by an optical system 64 which is analogous to the optical system which projects the first lines onto the paper. As can be seen in FIGURE 3, the optical system focusses the three separate lines on the storage tube screen into a single line, the segments 1—2, 2—3 and 3—4 of which are in the same alignment as the incoming video information. Opaque members 63 are to mask the electrofax paper and thereby to prevent it from being exposed by images other than the ones on the screen 50.

It should be appreciated that although the incoming information is displayed in three lines on the storage tube in the illustration of FIGURE 3, the invention is equally applicable to a system in which a much larger number of lines may be used. The only limiting factors are the time available for writing the information on the storage tube screen and the complexity of the optical system. In the first connection, it will be remembered that one line may be written on the storage tube screen at full brilliance in 1 microsecond. Since the incoming information arrives in 240 microseconds, in the illustration given, a maximum of 240 lines may be written on the screen. This would increase the resolution of the storage tube screen from 500 to 120,000. However, 240 lines would require a fairly involved optical system. As a practical matter, it is preferable to maintain the number of lines on the storage tube screen to about 20 or less with storage tubes of the size presently in use (10″ screens).

The moving recording medium (electrofax paper, in the example above) must be moved at the proper speed relative to the aircraft speed in order faithfully to reproduce the image. The ratio of paper speed to aircraft speed is dependent upon the scale of the image displayed on the cathode ray tube. As a simple example, if the aircraft speed is 10 miles per minute and the scale of the display on the cathode ray tube is 10 miles to the inch, the paper speed must be 1 inch per minute if the magnification of the imaging optical system is 1 to 1. Of course, in a practical system, a distance much smaller than 10 miles is displayed on 1 inch of the cathode ray tube so that, in a practical system, the speed of the moving paper is substantially greater than 1 inch per minute, assuming an aircraft speed of 10 miles per minute and 1 to 1 magnification in the optical system. Variation in the relative speeds of the paper and aircraft introduce distortions into the image on the paper.

The mechanism for controlling the speed of the paper is conventional and may be the same as that used for line exposure of camera films. For example, servo mechanism drives may be used for the paper which operate on information supplied by the air speed indicator or, in more elaborate system, on information supplied by ground speed measuring devices of the photo-electric or radar type.

The present invention is applicable to cases in which succeeding lines of the incoming radar information are similar, for example, cases analogous to A type radar displays or to cases in which succeeding lines of information are different, for example, cases in which the incoming information is like that received during a B type display or in which the incoming information consists of a television picture or succeeding lines of a photograph.

What is claimed is:

1. A recording system comprising, in combination, connections for a source of high resolution electrical signals; display means having an inherent resolution along one dimension of the screen thereof which is a fraction of the resolution of said signal; means connected to said connections and to said display means for dividing the signal into a plurality of successive parts and writing each part of the signal on a different one of a plurality of lines on the screen of the display means; a recording medium; and means for projecting the information displayed on the display means onto the recording medium with the displayed lines in end-to-end alignment.

2. A recording system comprising, in combination, connections for a source of high resolution electrical signals; display means having an inherent resolution along one dimension of the screen thereof which is a fraction of the resolution of said signal; means connected to said connections and to said display means for writing successive parts of the electrical signal along respective successive ones of a plurality of lines of the screen of the display means parallel to said one dimension; a recording medium; and means for projecting the information displayed on the display means onto the recording means with the displayed lines in end-to-end alignment.

3. A recording system as set forth in claim 2 in which the means for writing the electrical signal along a plurality of lines of the screen of the display means includes means for writing adjacent ones of said lines in opposite directions.

4. A recording system comprising, in combination, connections for a source of high resolution electrical signals; display means having an inherent resolution along one dimension of the screen thereof which is a fraction of the resolution of said signal; means connected to said connections and to said display means for writing successive parts of the electrical signal along respective successive ones of a plurality of lines of the screen of the display means parallel to said one dimension; a recording medium; and optical means for projecting the information displayed on the display means onto the recording means with the displayed lines in end-to-end alignment.

5. A recording system comprising, in combination, connections for a source of high resolution electrical signals; a direct view storage tube having an inherent resolution along one dimension of the screen thereof which is a fraction of the resolution of said signal; means connected to said connections and to said storage tube for writing successive parts of the electrical signal along respective successive ones of a plurality of lines on the storage tube screen; a recording medium; and means for projecting the information displayed on the storage tube screen onto the recording medium with the displayed lines in end-to-end alignment.

6. A recording system as set forth in claim 5, wherein the recording medium consists of electrofax paper.

7. A recording system as set forth in claim 6, and further including means for moving the electrofax paper in such manner that successive lines of the information recorded thereon do not overlap one another.

8. A radar system comprising a transmitter for transmitting radar pulses; a receiver for receiving echo pulses; direct view storage tube means operatively associated with the receiver for displaying the echo pulses received during each reception interval along a plurality of lines of the screen of the storage tube; a recording medium; and optical means in operative relation with the storage tube for projecting the lines on the screen onto the recording medium in end-to-end alignment.

9. A system as set forth in claim 8 in which the recording medium comprises electrofax paper.

10. A system as set forth in claim 8 in which the radar system is located in a moving vehicle, and further including means in operative relation with the recording medium for moving the same at a speed related to the speed at which the vehicle moves.

11. In combination, a display device on the screen of which electrical signals may be displayed, a recording medium having a resolution substantially higher than that of said screen; means for displaying successive parts of the signal along successive ones of a plurality of lines on said screen; and means for projecting the lines on the screen onto said medium in end-to-end alignment.

12. A recording system comprising, in combination, connections for a source of high resolution electrical signals; display means having an inherent resolution along one dimension of the screen thereof which is a fraction of the resolution of said signal; means for displaying successive parts of said signal along successive ones of a plurality of lines on the screen of the display means; a recording medium; and means for projecting the information displayed on the display means onto the recording medium with the displayed lines in end-to-end alignment.

13. In combination, a display means having a screen on which electrical signals may be written, a recording medium having a resolution substantially higher than that of said screen along the largest dimension across said screen, connections for incoming electrical signals, means for writing said signals on said screen along a path having a length which is substantially greater than said largest dimension, and means for optically transferring the signals written on the screen onto a recording medium in a substantially straight line.

14. The invention according to claim 13 wherein said path comprises discrete traces one alongside the other.

15. In combination, a display means having a screen on which electrical signals may be written, a recording medium having a resolution substantially higher than that of said screen along the largest dimension across said screen, connections for electrical signals occurring in time sequence, means for writing said signals on said screen in said time sequence along a path having a length which is substantially greater than said largest dimension, and means for optically transferring the signals written on the screen onto a recording medium in a substantially straight line and with the signals in position sequence corresponding to said time sequence.

16. A recording system comprising, in combination, connections for a source of high resolution electrical signals; a cathode ray tube having an inherent resolution along the largest dimension across the screen thereof which is a fraction of the resolution of said signal; means for writing successive parts of said signal along successive ones of a plurality of cathode ray traces on the screen of the cathode ray tube; said plurality of cathode ray traces having a total length when placed in end-to-end alignment that is substantially greater than said largest dimension across the screen; a recording medium; and means for optically transferring the information written on the cathode ray tube onto the recording medium with said cathode ray traces end-to-end in a straight line.

17. In combination, a cathode ray tube having a screen across which the electron beam of the tube may be deflected to produce a trace of light, an image receiving medium having a resolution substantially higher than that of said screen along the largest dimension across said screen, means for deflecting said beam to produce a trace of light along a path on said screen having a length which is substantially greater than said largest dimension, and means for optically transferring said trace of light onto said image receiving medium in a substantially straight line with successive portions of the resulting straight line trace of light occurring in the sequence in which the corresponding portions occur on said screen.

References Cited in the file of this patent

UNITED STATES PATENTS

| | | |
|---|---|---|
| 2,415,981 | Wolff | Feb. 18, 1947 |
| 2,422,295 | Eaton | June 17, 1947 |
| 2,430,307 | Smith | Nov. 4, 1947 |
| 2,549,072 | Epstein | Apr. 17, 1951 |
| 2,725,554 | Phillips | Nov. 29, 1955 |
| 2,727,428 | Herman | Dec. 20, 1955 |